United States Patent
Kamperman (10) Patent No.: US 8,752,190 B2
(45) Date of Patent: Jun. 10, 2014

(54) AUTHORIZED DOMAIN POLICY METHOD (75) Inventor: Franciscus Lucas Antonius Johannes Kamperman, Eindhoven (NL)

(73) Assignee: Adrea LLC, Sunnyvale, CA (US)

( * ) Notice: Subject to any disclaimer, the term of this patent is extended or adjusted under 35 U.S.C. 154(b) by 1274 days.

(21) Appl. No.: 11/914,785

(22) PCT Filed: May 3, 2006

(86) PCT No.: PCT/IB2006/051384
§ 371 (c)(1),
(2), (4) Date: Jul. 8, 2008

(87) PCT Pub. No.: WO2006/123265
PCT Pub. Date: Nov. 23, 2006

(65) Prior Publication Data
US 2008/0271158 A1      Oct. 30, 2008

(30) Foreign Application Priority Data
May 19, 2005   (EP) .................................... 05104240

(51) Int. Cl.
*H04L 29/06* (2006.01)
(52) U.S. Cl.
USPC .............. 726/27; 726/1; 726/2; 726/3; 726/4; 726/6; 726/26; 726/28; 726/29; 726/30; 713/165; 713/182
(58) Field of Classification Search
USPC .................. 726/26, 31–32, 1–2, 27; 380/202
See application file for complete search history.

(56) References Cited

U.S. PATENT DOCUMENTS

| 2002/0157002 A1* | 10/2002 | Messerges et al. ............ 713/155 |
| 2002/0194143 A1* | 12/2002 | Banerjee et al. .............. 705/400 |
| 2003/0018491 A1* | 1/2003 | Nakahara et al. ................. 705/1 |
| 2003/0023757 A1* | 1/2003 | Ishioka et al. ................ 709/246 |
| 2003/0023880 A1 | 1/2003 | Edwards |

(Continued)

FOREIGN PATENT DOCUMENTS

| WO | WO03092264 A1 | 11/2003 |
| WO | WO03098931 A1 | 11/2003 |

(Continued)

OTHER PUBLICATIONS

Nalburg et al, Dynamic Access Control: Preserving Saftey and Trust for Network Defense Operations, Jun. 2, 2003, ACM, pp. 231-237.*

(Continued)

*Primary Examiner* — Bradley Holder
*Assistant Examiner* — Jenise Jackson
(74) *Attorney, Agent, or Firm* — Finnegan, Henderson, Farabow, Garrett & Dunner LLP (57) ABSTRACT

The present invention relates to a method and a device for determining access to multimedia content from an entry identifier, in a domain which comprises a number of entry identifiers, and where the multimedia content is assigned an access number n indicating the number of entry identifiers which may access the multimedia content. This is obtained by accessing a domain list indicating at least some of said entry identifiers in said network domain and by further determining that the entry identifier may access said multimedia content if said entry identifier is between the n entries in said domain list determined by an evaluation rule.

14 Claims, 6 Drawing Sheets

(56) References Cited

U.S. PATENT DOCUMENTS

| | | | |
|---|---|---|---|
| 2003/0078891 A1* | 4/2003 | Capitant | 705/57 |
| 2004/0054787 A1* | 3/2004 | Kjellberg et al. | 709/228 |
| 2004/0093523 A1 | 5/2004 | Matsuzaki | |
| 2004/0103303 A1 | 5/2004 | Yamauchi | |
| 2004/0249759 A1* | 12/2004 | Higashi et al. | 705/59 |
| 2005/0021796 A1* | 1/2005 | McClain et al. | 709/229 |
| 2005/0065891 A1* | 3/2005 | Lee et al. | 705/59 |
| 2005/0071663 A1* | 3/2005 | Medvinsky et al. | 713/200 |
| 2005/0071669 A1* | 3/2005 | Medvinsky et al. | 713/200 |
| 2005/0102513 A1* | 5/2005 | Alve | 713/168 |
| 2005/0119967 A1* | 6/2005 | Ishiguro et al. | 705/38 |
| 2005/0154754 A1* | 7/2005 | Sheldon et al. | 707/102 |
| 2005/0182727 A1* | 8/2005 | Robert et al. | 705/51 |
| 2005/0185792 A1* | 8/2005 | Tokutani et al. | 380/30 |
| 2006/0122946 A1* | 6/2006 | Fahrny et al. | 705/71 |
| 2006/0123485 A1* | 6/2006 | Williams | 726/27 |
| 2006/0177066 A1* | 8/2006 | Han et al. | 380/277 |
| 2006/0179001 A1* | 8/2006 | Kim et al. | 705/57 |
| 2006/0230380 A1* | 10/2006 | Holmes et al. | 717/117 |
| 2007/0056040 A1* | 3/2007 | Van Den Heuvel et al. | 726/26 |
| 2007/0130068 A1* | 6/2007 | Kitazato et al. | 705/50 |
| 2008/0046985 A1* | 2/2008 | Lenoir et al. | 726/6 |
| 2009/0037388 A1* | 2/2009 | Cooper et al. | 707/3 |
| 2009/0144815 A1* | 6/2009 | Vrielink et al. | 726/7 |
| 2009/0217036 A1* | 8/2009 | Irwin et al. | 713/168 |
| 2010/0191833 A1* | 7/2010 | Hofrichter et al. | 709/219 |
| 2012/0090019 A1* | 4/2012 | Messerges et al. | 726/4 |

FOREIGN PATENT DOCUMENTS

| | | |
|---|---|---|
| WO | WO2004027588 A2 | 4/2004 |
| WO | WO2004038568 A2 | 5/2004 |
| WO | WO2004059451 A1 | 7/2004 |
| WO | WO2005010879 A2 | 2/2005 |
| WO | WO2005088896 A1 | 9/2005 |
| WO | WO2005093544 A1 | 10/2005 |
| WO | WO2006048804 A1 | 5/2006 |

OTHER PUBLICATIONS

Hartung et al, Digital Rights Management and Watermarking of Multimedia Content for M-Commerce Applications, Nov. 2000, IEEE, pp. 78-84.*

E Bertino et al., "An Access Control Mechanism for Large Scale Data Dissemination Systems", Research Issue in Data Engineering, 2001 Proceedings Eleventh Int'l Workshop, Apr. 2001, pp. 43-50.

S. Sovio et al., "Defining Authorization Domains using Virtual Devices", Applications and the Internet Workshops, 2003, Proceedings 2003 Symposium on Jan. 2003, pp. 331-336.

* cited by examiner

AUTHORIZED DOMAIN POLICY METHOD

FIELD OF THE INVENTION

The present invention relates to a method and a device for determining access to multimedia content from an entry identifier.

BACKGROUND OF THE INVENTION

Different and to some extent conflicting interests as to how multimedia contents should be protected from unauthorized copying, exist between the content owners and providers and the consumers. On the one hand the content owners and providers naturally want protection of their copyrights while on the other the content consumers want to be allowed unrestricted and uncomplicated content use. The main aim of an authorized domain is to respect both the interests of the content owners (and/or content providers) and the content consumers, in the sense that the consumer is free to access and distribute content within the entire authorized domain, while at the same time the rights of the content owners and providers are covered by imposing strict import and export rules to prevent unlimited digital copying of the content and content distribution across domains.

The basic principle of authorized domains is to have a controlled network environment in which content can be used relatively freely as long as it does not cross the border of the authorized domain. Typically, authorized domains are centered around the home environment, also referred to as home networks. Of course, other scenarios are also possible. A user could, for example, take a portable television with him on a trip and use it in his hotel room to access content stored on his Personal Video Recorder at home. Even though the portable television is outside the home network, it is a part of the user's authorized domain.

An authorized domain can be device based, person based or a hybrid of the two. In typical device based authorized domains, the domain is formed by a specific set of devices and content items. Examples of such device-based ADs are given in international patent application WO 03/098931, international patent application WO 2005/088896 and international patent application WO 04/027588 by the same applicant, all of which are hereby incorporated by reference.

One type of device-based AD allows a set of clients bound to a domain to access content bound to that domain. This double binding assures that all the members can access the content. There is not made any distinction of the various users of the specific set of devices. A drawback of device based authorized domain systems is that they typically do not provide the typical flexibility that a user wants or need, since users are restricted to a particular and limited set of devices. In this way, a user is not allowed to exercise the rights that the user has obtained anytime and anywhere and on any device he chooses.

Another type of previous solutions is person based authorized domains as described in e.g. WO 2004/038568 by the same applicant, incorporated herein by reference, where the domain is based on persons instead of devices as was the case for device based authorized domains. In person-based authorized domains, content is coupled to persons which then are grouped into a domain. In a typical person based authorized domain access to content bound to that authorized domain is allowed by only a specific and limited set of users, but e.g. using any compliant device. Person based Authorized Domains typically offer easier domain management compared to device based authorized domains. However, person based systems require person identification every time which is seldom convenient or preferred by users.

A so-called Hybrid Authorized Domain-based DRM system ties content to a group that may contain devices and persons. Examples of hybrid AD systems can be found in international patent application WO 2005/010879 and in international patent application WO 2005/093544, both incorporated herein by reference.

International patent application serial number IB2005/053531 discloses a way to allow person based access to content in a domain in AD systems that are device based by design.

A very important functionality in authorized domains is authorized domain management determining who (persons) or what (devices) can be part of the authorized domain according to some policy and how they can have access to content items. The most common authorized domain policy is simply that the domain has a built-in fixed and unchangeable upper limit to the number of how many devices and/or persons are allowed in the domain. Although being a simple rule to implement, such a rule is far from ideal for a content consumer. For one thing it is difficult to choose a suitable limit as both parties will have to agree to this limit. Furthermore, changing the devices and/or persons in his domain becomes rather cumbersome as he will have to delete one device and/or person before being allowed to add a new one. Also, the described policy gives no possibility for the content provider to change this maximum number for instance based on a special offer etc.

OBJECT AND SUMMARY OF THE INVENTION

It is therefore an object of the present invention to describe an authorized domain policy overcoming the abovementioned problems while both respecting the interests and the rights of the content owners (and/or content providers) by imposing a strict rule to prevent unlimited digital use and giving the content consumer maximum flexibility as to where and by whom a content item within the authorized domain is accessed.

This is obtained in one embodiment of the invention by a method for determining access to multimedia content from an entry identifier, in a domain comprising a number of entry identifiers, said access being determined using an access number n indicating the number of entry identifiers which may access said multimedia content, and where said method comprises the steps of accessing a domain list indicating at least some of said entry identifiers in said network domain, and
  determining that said entry identifier may access said multimedia content if said entry identifier is between the n entries in said domain list determined by an evaluation rule.

Hereby is obtained that the content provider easily can change the access number n connected to the multimedia content for instance during a special offer, if the consumer chooses to pay more etc. This is advantageous in that it may stimulate the competition between different service providers. Nevertheless, the content provider still has the full control over the size of a domain using the multimedia content and therefore unlimited copying of the content is still maintained. A further advantage by the presented method for determining access to multimedia content is that the authorized domain can stay the same (even with a changing access number n). This makes it easier and more comprehendible for the content consumer to built, maintain and use an authorized domain. Furthermore, a content consumer or a person in an authorized domain can make an ordered domain list over the entry identifiers if he wants to but he does not have to. Such an order ensures the priorities of the users and consumers of the multimedia contents in that the user can always use the content on his most important and relevant devices/persons in relation to that specific multimedia device. Further, as the domain list is no longer of a fixed unchangeable length the order of the entry identifiers occurring on the domain list can now easily be changed, i.e. entry identifiers can be added, deleted or reordered. Further advantageous are mentioned throughout the detailed description.

The method can in another embodiment further comprise the steps of determining the category of said multimedia content, and accessing a domain list linked to said category of said multimedia content. Hereby is obtained that different domain lists can be made to fit specific categories or types of multimedia content yielding a maximum flexibility of the system even though the domain stays the same.

In yet a further embodiment the method described above comprises the steps of determining the category of said multimedia content, and then using an evaluation rule linked to said category of said multimedia content in determining if said entry identifier may access said multimedia content.

In other embodiments the method according to the above further comprises the step of updating said domain list according to said entry identifiers being connected to a network at the time of update, according to said entry identifiers being available on a network at the time of update, or according to said entry identifiers being used the most at the time of update. By updating the domain list according to any of the three proposed rules is obtained that the access to the content items is granted to the most relevant devices and/or person in the domain.

The present invention also relates to a computer-readable medium having stored therein instructions for causing a processing unit to execute a method according to any of the abovementioned descriptions. The advantages to this are as described above in relation to the method for determining access.

The present invention further relates to a device adapted for determining access to multimedia content from an entry identifier in a domain comprising a number of entry identifiers, said access being determined using an access number n indicating the number of entry identifiers which may access said multimedia content, and where said device comprises means for accessing a domain list indicating at least some of said entry identifiers in said network domain, and means for determining if an entry identifier may access said multimedia content by evaluating if said entry identifier is between the n entries in said domain list determined by an evaluation rule. The advantages to this are as described above in relation to the method for determining access with further advantages being mentioned throughout the description.

In another embodiment of the invention the device described above further comprises means for determining the category of said multimedia content.

The above mentioned device can according to yet more embodiments comprise means for evaluating a domain list linked to said category of said multimedia content or means for applying an evaluation rule linked to said category of said multimedia content in determining if said entry identifier may access said multimedia content.

According to the invention a device can further be adapted for determining access according to the above and further comprising means for updating said domain list according to said entry identifiers being connected to a network at the time of update, according to said entry identifiers being available on a network at the time of update, or according to said entry identifiers being used the most at the time of update.

The device described by the previous may further comprise means for changing said domain list by adding, deleting or reordering said entry identifiers.

BRIEF DESCRIPTION OF THE DRAWINGS

In the following preferred embodiments of the invention will be described referring to the figures, where FIG. 1 schematically shows a prior art system comprising devices interconnected via a network, in which system the present invention advantageously can be applied.

DESCRIPTION OF PREFERRED EMBODIMENTS

Figure 1:
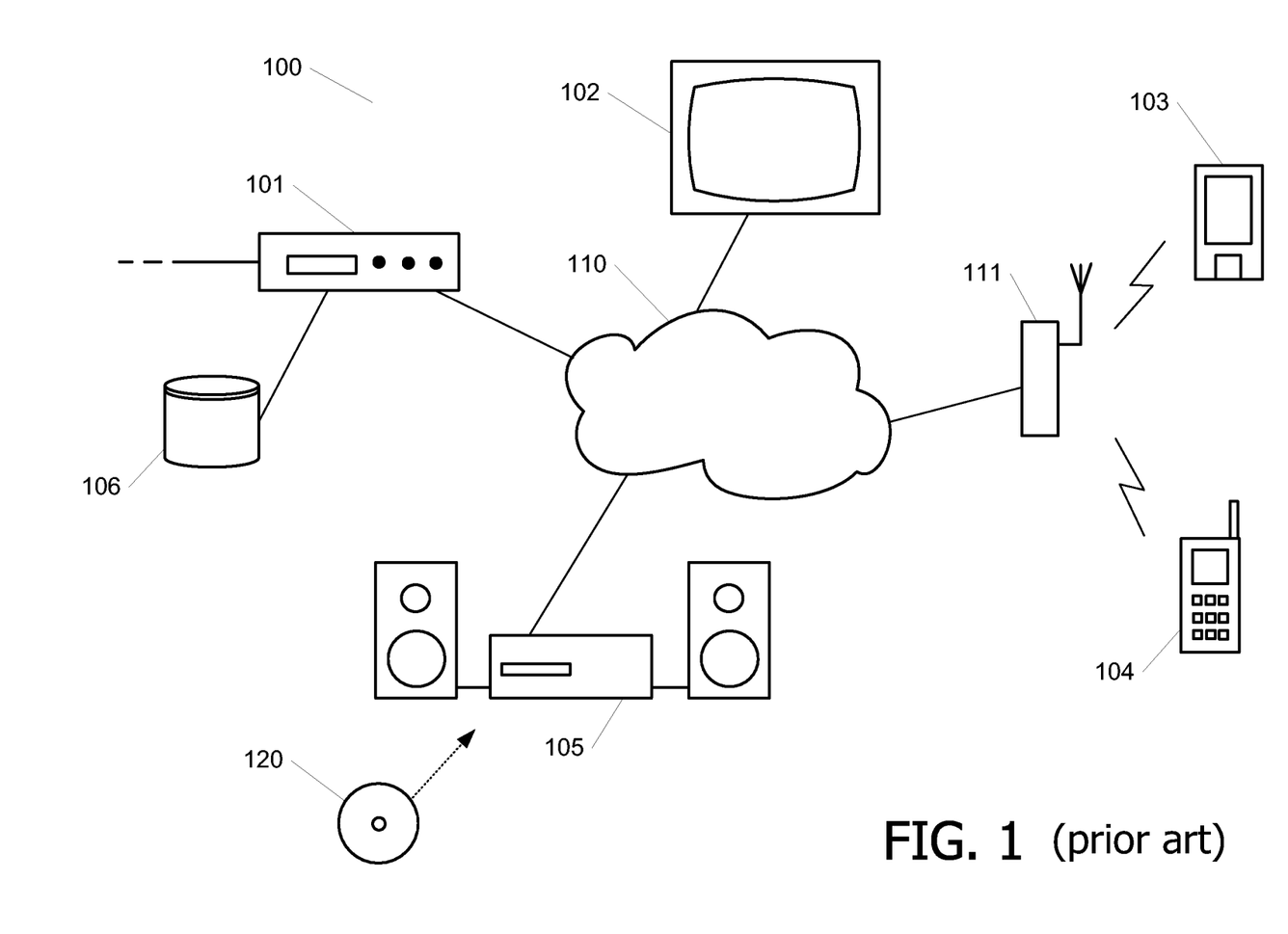

FIG. 1 schematically shows a system 100 comprising devices 101-105 interconnected via a network 110, in which the present invention can be applied. In this example, the system 100 is an in-home network. A typical digital home network includes a number of devices, e.g. a computer, a mobile phone 104, a radio receiver, a tuner/decoder, a CD player 105, a pair of speakers, a television 102, a VCR, a tape deck, and so on. These devices are usually interconnected to allow one device to share content and information with another device. The portable display device 103 and the mobile phone 104 are connected wirelessly to the network 110 using a base station 111, for example using BlueTooth or IEEE 802.11b. The other devices are connected using a conventional wired connection.

Multimedia content typically being datatext, software, sound, picture etc. relating to things like music, songs, movies, TV programs, pictures, books and the like, but which also includes interactive services and computer code such as games, is typically received through a residential gateway which might be a set top box 101. This could be a connection to a broadband cable network, an Internet connection, a satellite downlink and so on, or could enter the home network via other sources, such as storage media like discs 120 or using portable devices. The content can then be transferred over the network 110 to be used on another device as for instance the television display 102, the portable display device 103, the mobile phone 104 and/or the audio playback device 105.

The exact way in which a content item is rendered depends on the type of device and the type of content. For instance, in a radio receiver, rendering comprises generating audio signals and feeding them to loudspeakers. For a television receiver, rendering generally comprises generating audio and video signals and feeding those to a display screen and loudspeakers. For other types of content a similar appropriate action must be taken. Rendering may also include operations such as decrypting or descrambling a received signal, synchronizing audio and video signals and so on.

The set top box 101, or any other device in the system 100 such as a Personal Digital Recorder, may comprise a storage medium 106 such as a suitably large hard disk, allowing the recording and later playback of received content. Content can also enter the system 100 stored on a carrier 120 such as a Compact Disc (CD) or Digital Versatile Disc (DVD).

Figure 2:
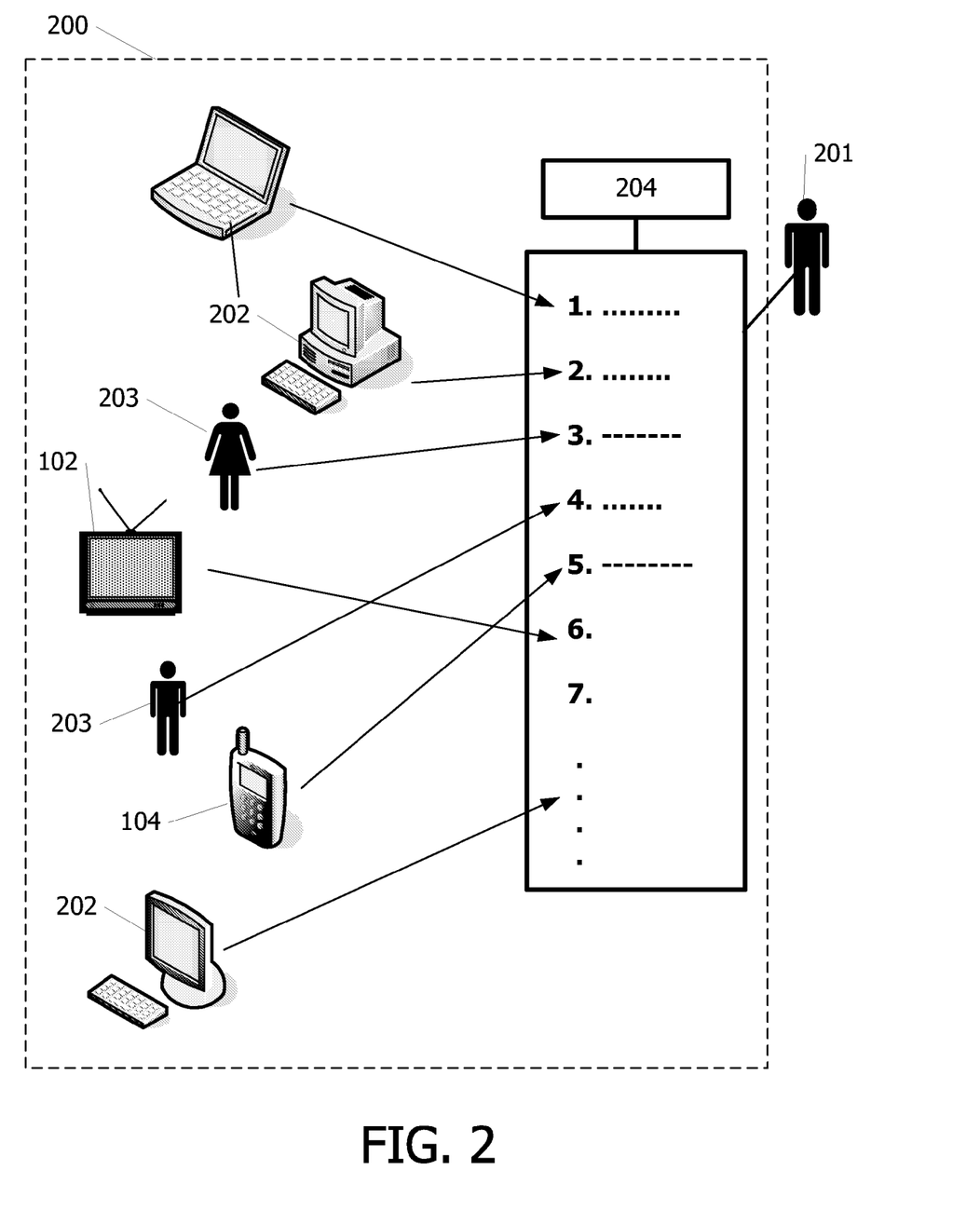
FIG. 2 shows a schematic view of an authorized domain setup according to one embodiment of the present invention.

FIG. 2 shows a schematic view of an authorized domain 200 being set up by a domain manager 201. The authorized domain 200 in this figure being depicted as a hybrid could comprise a number of multimedia devices such as a TV 102, computers 103, MP3-players etc along with one or more persons 203. Each device and each person would be given some kind of identity, in the following called the entry identifiers. As an entry identifier relating to a specific authorized domain could then,—depending on whether the authorized domain is device based, person based or a hybrid,—relate to a specific device, a specific person or a combination of the two, i.e. relating to a specific person using a specific device. When setting up the domain, the domain manager can choose to make an ordered domain list 204 of some or all of the devices and/or persons in the domain identified by their entry identifiers. According to one embodiment of this invention, the order of the entry identifiers on this list is essential to the management of accessing of multimedia contents within the domain in that access in the simplest case is granted to a number of devices or persons having their entry identifiers as the first on the list. This is further described in details in relation to FIG. 4. The domain list 204 can be put together by any person authorized to do so or by any other person belonging to the authorized domain. In one embodiment of the invention a default domain list is made automatically by the system where all the devices and/or persons via their entry identifiers in the domain are listed either randomly or according to some general rule. Such a rule could for instance be, that the devices and persons are listed according to when they entered the domain, or a rule could be that the computers were listed first, then the persons, then all gaming devices if any etc. In another embodiment the list could also be listing the devices according to how much they are used. The default list is then used in the management of the digital rights in the case where no user has chosen to make a list. The domain list 204 is stored in some central control point or controller belonging to the network. It can also be stored locally on some or even on all the devices within or outside the domain. The important part is here that a device and/or person wanting to use a content item has or has had access to the domain list either directly or indirectly for evaluation access content purposes.

In one embodiment of the invention the domain list could furthermore be updated from time to time by the central controller so as to only contain the entry identifiers presently being connected to the domain at the time of update. The list could also be updated according to the devices turned on and/or persons being logged on. Such updating could advantageously be performed whenever changes in the domain as to new devices/persons are detected, or at regular intervals, or at predetermined hours. The update could also be performed every time the domain list is asked for or needed. Restrictions on how often or under what conditions such an update of the domain list is allowed to be updated, could be imposed to prevent exploitation of the system.

It may occur that a portable device, such as devices 103 and 104, is one of the devices on the list. The portable device subsequently may be moved outside the range of the base station 111, or be disconnected from a device to which they were tethered (as would be the case with e.g. a portable music player such as an Apple iPod). In such an event, one embodiment of the invention proposes that no updates to the list may occur until this portable device has returned to the authorized domain. This prevents the situation where a user adds the portable device to the list, transfers content to this portable device, disconnects it and then removes the portable device from to the list so that he may add another device. The disconnected portable device cannot learn of the list change and so would continue to allow access to the content transferred to it. As a result there would be more than n devices that have access to content simultaneously.

In another embodiment, no updates to the list may occur until all portable devices that have been registered as domain members have returned to the authorized domain, even when those portable devices are not on the list. This ensures that all devices in the domain learn of list updates. It prevents a situation where a user removes a device from the list, and then transfers content to this removed device from a portable device with an old version of the list. This portable device will permit the transfer, since according to its version of the list this device is not removed.

The list can be changed (i.e. adding, deleting, reordering of the entry identifiers relating to the devices and/or persons) by the domain manager automatically or under operation of any person authorized to do so, either whenever he wants to or according to some rule (for instance a maximum number of times, or not too often, or only when a new device is added/deleted etc.). Such modifications or alterations can be performed independently of any content provider and independently of any current content access numbers, whereby is obtained a far more flexible domain management system than in the prior art, where a domain could only contain a certain fixed maximum number of devices and/or persons.

Figure 3:
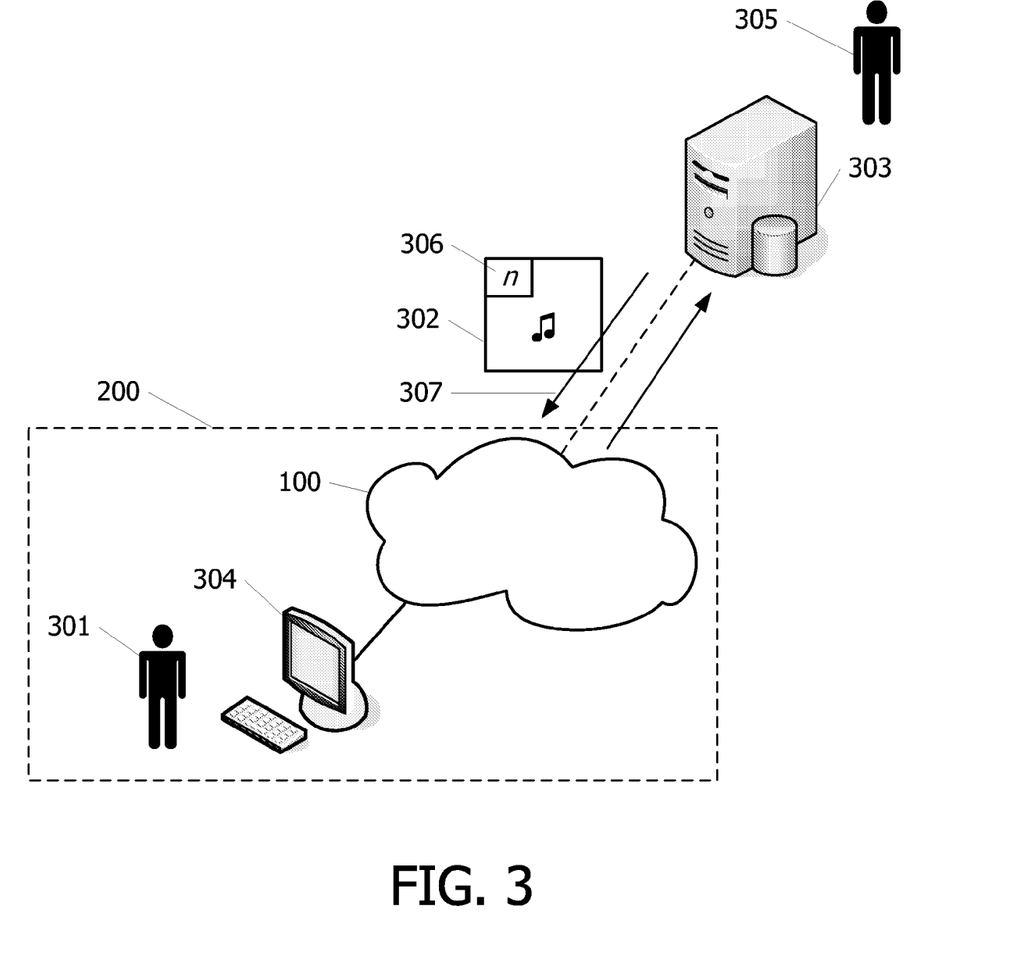
FIG. 3 illustrates the purchase of a content item.

In FIG. 3 is shown schematically the situation of a content consumer 301 buying a multimedia content item 302 (for instance a game, some music, a movie, a programming tools etc). The content item is in the figure illustrated by the note 302. The content consumer 301 logs on to the site of a content provider 303 via the Internet or some other appropriate network. Either the consumer is authorized to do so or the consumer logs on via an authorized device 304. When buying and acquiring the content item the consumer together with the content provider 305 agree on the license conditions and by how many devices and/or persons 306. This agreement can also be more or less implicit in that one of the above limitations or both could be for instance fixed a priori or unlimited. One could very well imagine that the price of the content item 302 is very heavily dependent on these two parameters defining the main access limitations. Upon having bought the content item, the item is then transferred 307 to the consumer together with the license conditions and information on the access parameters if not unlimited. That is, information on by how many devices/persons a content item can be used, in the following being called the content access number n. The assigned access number could in an alternative embodiment also be related to the device, domain or system and be assigned because the content is used in the device, domain or system.

A consumer can of course also choose to buy the content item in a conventional store. In this situation the content can be handed over to the consumer e.g. on a CD, a DVD or a memory stick. The information on the access parameters could here then be stored together with the content by e.g. watermarking or indicated by a right.

As described under FIG. 1 the multimedia content can be stored or placed on a central hard disk 106. Another possibility is that it is kept locally on any device. The devices and/or persons connected to an authorized domain are normally able to and allowed to freely distribute the content items within the authorized domain. This way e.g. content stored on one device can easily be retrieved by another device. Whether the device can use the content item then depends on the type of digital rights policy applied.

According to the present invention the access is controlled by the so-called device access number n described previously in context with the domain list. What happens if a content consumer wants to use a content item on a device is first of all that the device retrieves the content item from wherever it is stored if it is not already directly accessible on the device. However, the content item can only be used on this specific device if the content access number n connected to the content item complies with the placing of the entry identifier of the device or the consumer on the relevant ordered domain list. This is checked according to some evaluation rule—for instance permission is given to the n first entries on the list— or the n last entries—or every third entry on the list, the total being smaller than or equal to n, etc. If the entry identifier is among the n number of devices and/or persons being allowed to use the content item then it is ok—the content item can be played. Otherwise the request for accessibility is rejected.

Figure 4:
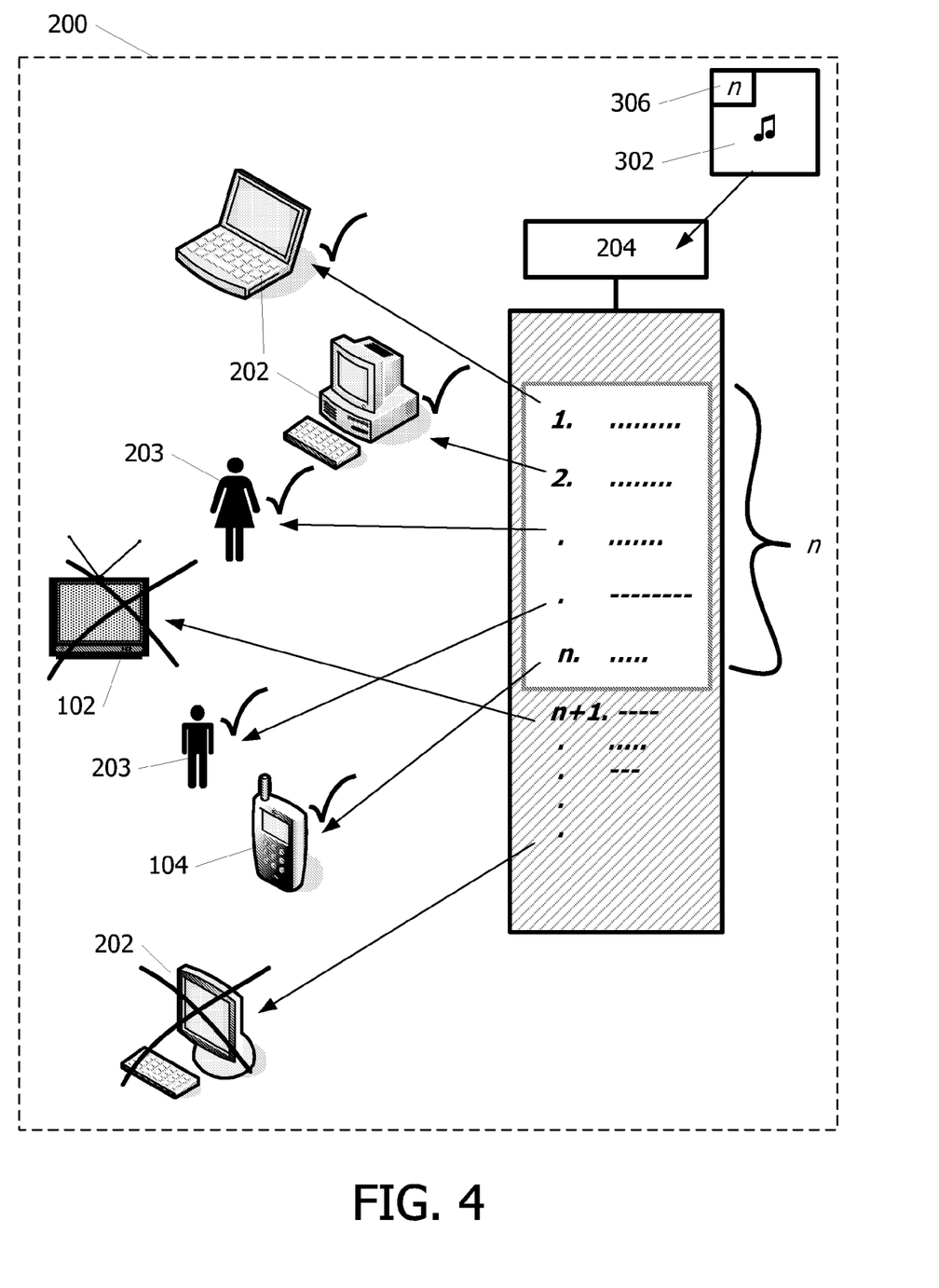
FIG. 4 illustrates the distribution of access to a content item according to one embodiment of the invention.

The access policy is illustrated in FIG. 4. Here the multimedia content item 302 with the connected content access number n 306 is combined with the current domain list 204. In this example shown the content access number n 306 determines that the n first entry identifiers on the domain list 204 can have access to use the content item 302. Here access is therefore given to the devices and the persons marked with the check marks which carried the first n entry identifiers. The rest of the devices (crossed out in the figure at hatched positions in the domain list) are denied access. One of the big advantages of the presented access policy is that the ordering of the domain list along with the evaluation rule ensure the priorities of the consumer(s) in the domain in the sense that the multimedia content item can always be used on the most important and relevant devices and/or persons in relation to that specific multimedia content.

As mentioned earlier, the domain list can both be placed in some central controller device and locally on some or all of the devices. If the domain list is placed in some central controller the comparison of the domain list with the content access number n could in one embodiment of the invention be carried out in the central controller. In this case the content access number is retrieved from wherever the content item is together with the entry identifier of the device and/or person asking for permission to use the content item. The location of this entry identifier is found on the domain list. The access request can of course be denied right away if the entry identifier of the device or person does not appear on the list at all. After having identified where the domain or person appears on the domain list, this placing is then compared with the content access number n using the predetermined evaluation rule. Depending on the result of this comparison an access or denial signal is then sent back to the device or person.

In another embodiment of the invention this comparison of content access number n with the domain list can also be performed on the device wanting to use the content item itself. Also the checking described above could take place just before or as the device or person wants to use the content item. Another possibility is however, that the checking is done earlier than that. This could for instance be advantageous in the case where a device wants to use a content item at a time or place where it is in fact disconnected from the home network. Here, the access to the content item(s) that the consumer would like to bring along on the device for later use could be checked and granted before disconnecting the device. Another possibility is in this case that the device acquires the relevant domain list before disconnecting and then itself performs the checking of access later as appropriate.

However, content items acquired by one or more consumers in the same domain can be of very different types and to be used on different types of devices or persons. For instance, a movie should most preferably be able to be played on all the TVs in the house as well as on the computers, while a programming tool on the same time should be accessible only on the computers and some kind of game only on the playstation. Therefore, in a particular embodiment of the invention it is advantageous to have more than one domain list where each list then is associated to different types or categories of content items.

Figure 5:
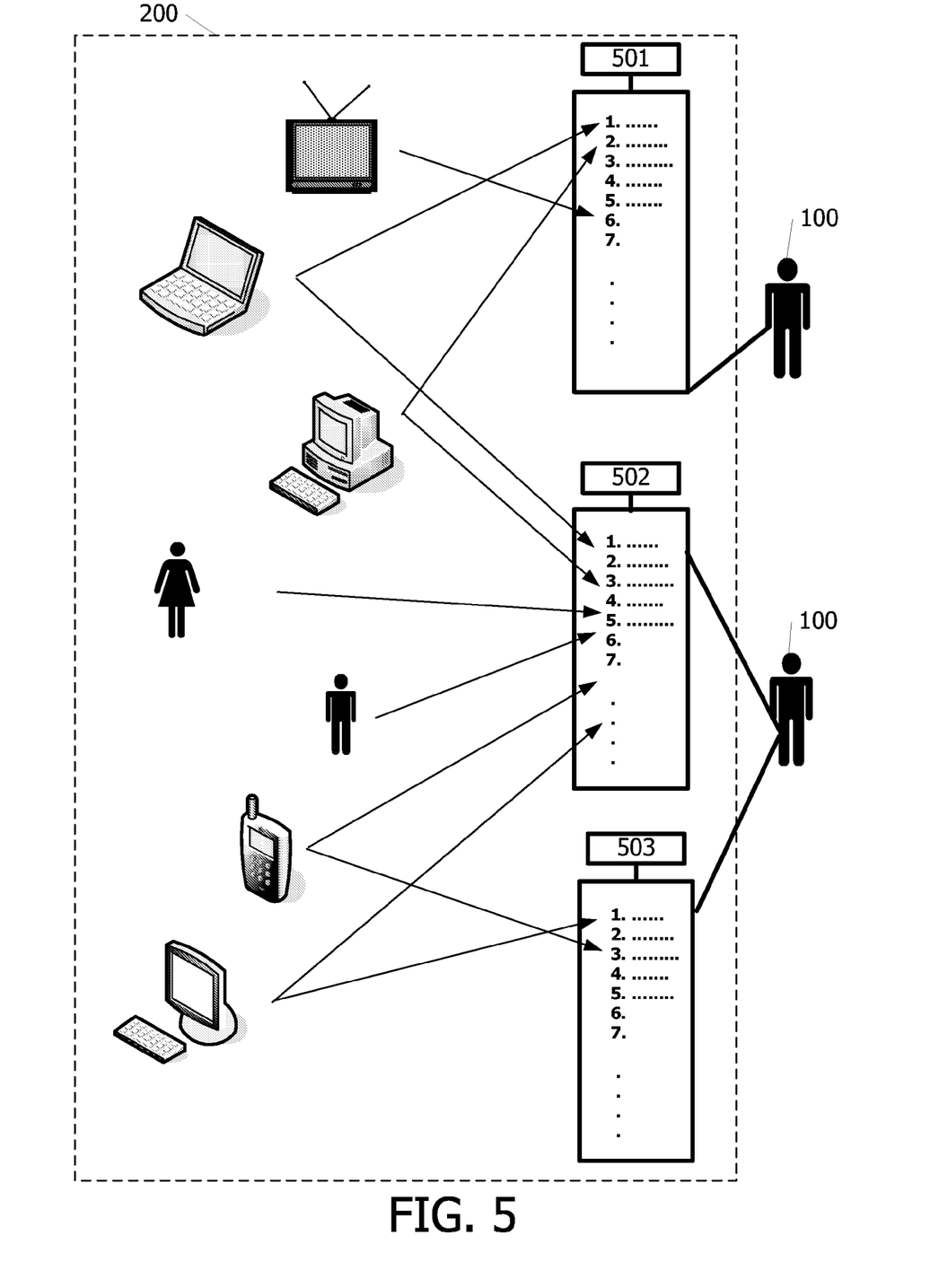
FIG. 5 illustrates the construction of domain lists relating to different groups of content items.

As illustrated in FIG. 5 a number of domain lists 501, 502, 503 can be made. Of these lists one of them is the default list. As an example of different categories of content items one could have a category and an associated list for programming tools and compilers, a second list for games, a third list for music for the kids, a fourth list for music for the jazz enthusiast etc. In this way the kids can put the entry identifiers of their radios and computers in their rooms on the top of the domain list for kid's music and are thus ensured that they will be given access on these their most important devices to the music they buy. These domain lists and the categories are chosen as described before by the domain manager or one or more of the persons belonging to the domain. If several lists are made, one of these is chosen (by the user or by the system) as the default list which is to be used if none other is chosen. If there is more than one ordered list, the content consumer can then choose which domain list is to be associated to this specific content item. This can be done once and for all when the content item is bought or the first time the content item is used or alternatively every time the content item is used or just whenever the consumer wants to. If no list is associated by a consumer the default domain list is used.

In another embodiment of the invention different categories of multimedia contents can be handled by having for instance only one domain list, but instead a number of different evaluation rules, each relating to a specific category of content. One evaluation rule can then for instance be that a pop song with an access number n, can be played on the total n entry identifiers related to MP3-players and mobile phones belonging to the teenage daughter etc. The evaluation rule or rules used in determining the access to a certain multimedia content can be chosen by the content consumer, or by the content provider, or by the domain manager. Both this embodiment and the one previously described ensure the maximum flexibility of the authorized domain to the different demands and needs of the users of the multimedia contents.

Figure 6:
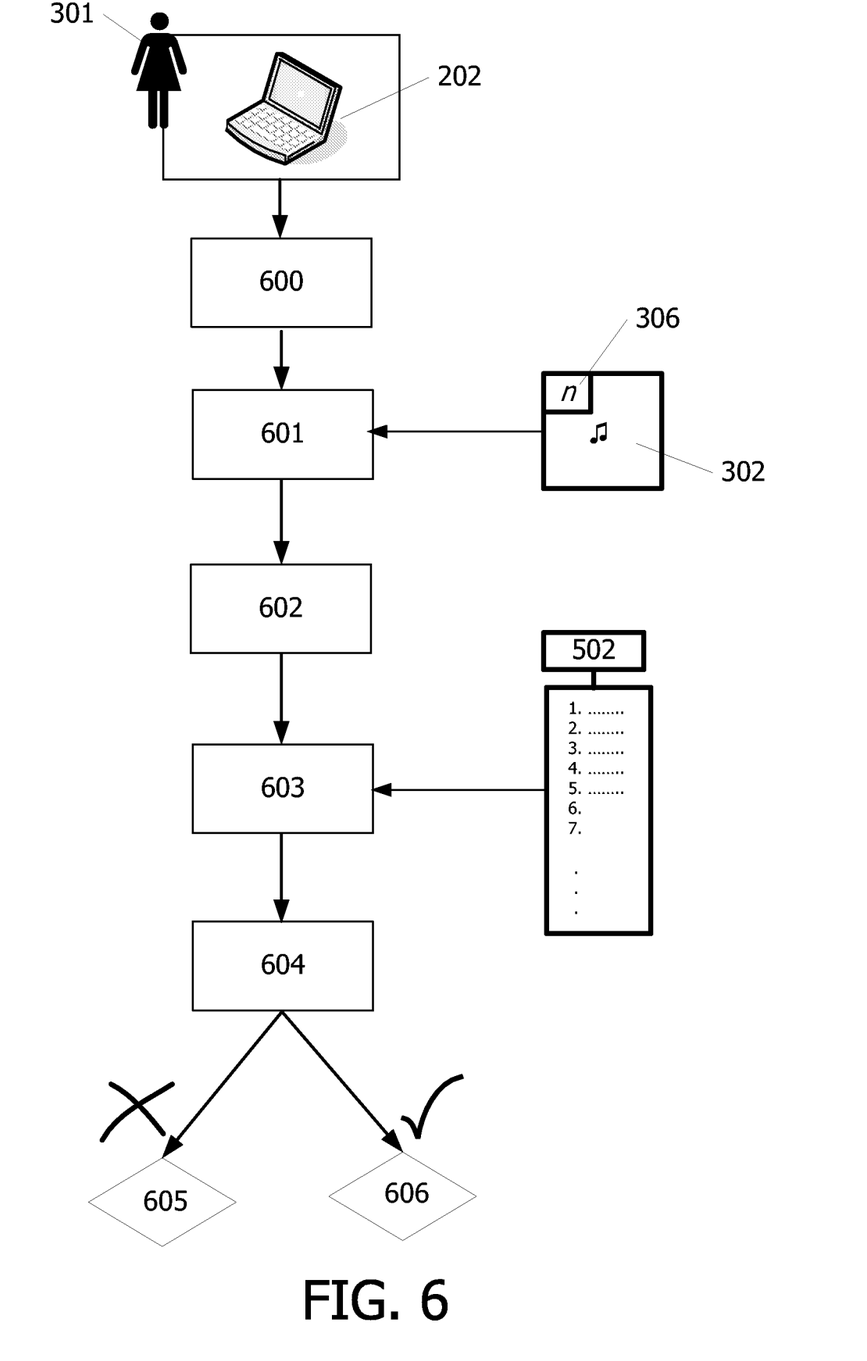
FIG. 6 shows an example of a consumer wanting to use a content item.

In FIG. 6 is illustrated the situation where a consumer 301 wants to use a content item 302 on a device. In this specific example the multimedia content item 302 is a movie that the user 301 wants to see on her laptop 202. First the device obtains its entry identity, 600. Depending on the situation and how the authorized domain is built, the entry identifier can as described previously relate specifically to the device, to the person using it, or a combination hereof i.e. the specific person on that specific device. The movie 302 is then retrieved along with the content access number n 306 associated to it, 601. The content item is retrieved for instance simply from the hard disk of the device, from some kind of storage media like a CD or DVD, or via the home network from another device or person in the domain. It is then determined, 602, which category of content items 502 the movie belongs to, for instance the category of cartoons, action movies etc. If there is only one domain list this step is of course not necessary. The relevant domain list 502 is then accessed, 603 either in the device itself or in another device. The list is evaluated, 604, by the use of the access number n 306 and the evaluation rule. In a simple case this could mean that if the entry identity of the laptop appears on the domain list among the top n entries, then access to the content item 302 is granted, 606, and the movie can be played on the laptop. On the other hand if the entry identity of the laptop is not one of the first n entries on the domain list then the access is denied, 605, and the laptop cannot play the movie.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for determining access to multimedia content from an entry identifier in a network domain comprising: a total number of entry identifiers, said method being performed by a system comprising a processor and a non-transitory computer medium coupled to the processor storing executable program instructions that, when executed by the processor, are configured to cause the system to perform said method, said method further comprising:
   retrieving an access number n indicating a number of entry identifiers selected from said total number which may access said multimedia content;
   obtaining an evaluation rule based on determining a category of said multimedia content;
   accessing a domain list linked to said category of said multimedia content, wherein said domain list indicates at least some of said entry identifiers in said network domain; and
   determining that said entry identifier may access said multimedia content if said entry identifier is an entry identifier within a range of n entries in said domain list as determined by the evaluation rule linked to said category of said multimedia content.

2. The method according to claim 1, said method further comprising:
   updating said domain list according to said total number of entry identifiers being connected to or available on a network at the time of update.

3. The method according to claim 2, wherein the updating of said domain list is prevented while a device that has been registered as member of the network domain is no longer connected to or available on the network.

4. The method according to claim 1, said method further comprising:
   updating said domain list according to which of said total number of entry identifiers which has been used most at the time of update.

5. The method according to claim 1, wherein said evaluation rule is determined by the device which accesses said multimedia content.

6. The method according to claim 1, wherein said evaluation rule is determined by the provider of said content.

7. A method according to claim 1, in which the domain list is an ordered domain list comprising all of said total number of entry identifiers, and in which the range of the n entries are the first n entries in said ordered domain list.

8. A non-transitory computer-readable medium having stored therein instructions that when executed by a processor cause a processing unit to execute a method for determining access to multimedia content from an entry identifier in a network domain comprising a total number of entry identifiers, said method comprising:
   retrieving an access number n indicating a number of entry identifiers selected from said total number which may access said multimedia content;
   obtaining an evaluation rule based on determining a category of said multimedia content;
   accessing a domain list linked to said category of said multimedia content, wherein said domain list indicates at least some of said entry identifiers in said network domain; and
   determining that said entry identifier may access said multimedia content if said entry identifier is an entry identifier within a range of n entries in said domain list determined by the evaluation rule linked to said category of said multimedia content.

9. A device for determining access to multimedia content from an entry identifier in a network domain, said device comprising:
   a processing unit, and
   a non-transitory computer-readable medium coupled to the processing unit storing instructions that, when executed by the processing unit, cause the device to:
   retrieve an access number n indicating a number of entry identifiers selected from said total number which may access said multimedia content;
   obtain an evaluation rule based on determining a category of said multimedia content;
   access a domain list linked to said category of said multimedia content, wherein said domain list indicates at least some of said total number of entry identifiers in said network domain; and
   determine if said entry identifier may access said multimedia content by evaluating if said entry identifier is an entry identifier within a range n entries in said domain list determined by the evaluation rule linked to said category of said multimedia content.

10. The device according to claim 9, wherein the instructions are further configured to cause the device to:
    apply an evaluation rule linked to said category of said multimedia content in determining if said entry identifier may access said multimedia content.

11. The device according to claim 9, wherein the instructions are further configured to cause the device to:
    update said domain list according to said total number of entry identifiers being connected to a network at the time of update.

12. The device according to claim 9, wherein the instructions are further configured to cause the device to:
    update said domain list according to said total number of entry identifiers being available on a network at the time of update.

13. The device according to claim 9, wherein the instructions are further configured to cause to the device to:
    update said domain list according to said total number of entry identifiers being used the most at the time of update.

14. The device according to claim 9, wherein the instructions are further configured to cause the device to:

change said domain list by adding, deleting or reordering said at least some entry identifiers.

\* \* \* \* \*